US011214380B2

(12) United States Patent
de Bock et al.

(10) Patent No.: US 11,214,380 B2
(45) Date of Patent: Jan. 4, 2022

(54) INTELLIGENT MISSION THERMAL MANAGEMENT SYSTEM

(71) Applicant: General Electric Company, Schenectady, NY (US)

(72) Inventors: Hendrik Pieter Jacobus de Bock, Clifton Park, NY (US); Matthew Robert Cerny, Indialantic, FL (US); Gary Quackenbush, Grand Rapids, MI (US); Eric Westervelt, Niskayuna, NY (US); William Gerstler, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 342 days.

(21) Appl. No.: 16/052,021

(22) Filed: Aug. 1, 2018

(65) Prior Publication Data

US 2018/0354641 A1 Dec. 13, 2018

Related U.S. Application Data

(63) Continuation-in-part of application No. 15/609,974, filed on May 31, 2017, now abandoned.

(51) Int. Cl.
*B64D 33/08* (2006.01)
*G05D 23/19* (2006.01)
(Continued)

(52) U.S. Cl.
CPC ............ *B64D 33/08* (2013.01); *B64D 37/00* (2013.01); *G05D 23/1917* (2013.01);
(Continued)

(58) Field of Classification Search
CPC .. G08G 5/006; G05D 1/0005; G05D 23/1917; B64D 33/08; B64D 37/00; B64D 2013/0614
See application file for complete search history.

(56) References Cited

U.S. PATENT DOCUMENTS 4,130,863 A 12/1978 Schweitzer et al.
4,159,088 A 6/1979 Cosley
(Continued)

FOREIGN PATENT DOCUMENTS

CN 106970523 A 7/2017
EP 2151905 A2 2/2010
WO 2012025687 A2 3/2012

OTHER PUBLICATIONS

Valenti et al., "Embedding Health Management into Mission Tasking for UAV Team", 2007 American Control Conference, pp. 5777-5783, New York, 2007, 7 pp.
(Continued)

*Primary Examiner* — Christopher D Hutchens
(74) *Attorney, Agent, or Firm* — Dority & Manning, P.A.

(57) ABSTRACT

According to some embodiments, system and methods are provided, comprising receiving one or more mission objectives for an aircraft mission, and condition data at a mission execution module; generating, via the mission execution module, a mission plan executable to address at least one of the one or more mission objectives via manipulation of a power-thermal management system (PTMS); receiving the generated mission plan at the PTMS directly from the mission execution module; and automatically executing the generated mission plan to operate an aircraft. Numerous other aspects are provided.

20 Claims, 10 Drawing Sheets

(51) Int. Cl.
  *B64D 37/00* (2006.01)
  *H04B 7/185* (2006.01)
  *B64D 13/06* (2006.01)

(52) U.S. Cl.
  CPC . *H04B 7/18506* (2013.01); *B64D 2013/0614* (2013.01); *B64D 2221/00* (2013.01)

(56) References Cited

U.S. PATENT DOCUMENTS

| | | | |
|---|---|---|---|
| 4,505,124 A * | 3/1985 | Mayer | B64D 37/34 |
| | | | 123/553 |
| 5,408,413 A | 4/1995 | Gonser et al. | |
| 6,618,631 B1 | 9/2003 | Johnson et al. | |
| 6,823,253 B2 | 11/2004 | Brunell | |
| 7,471,996 B2 | 12/2008 | Bartel | |
| 8,086,387 B2 | 12/2011 | Bradley et al. | |
| 8,321,118 B2 | 11/2012 | Moeckly et al. | |
| 8,417,361 B2 | 4/2013 | Kumar et al. | |
| 8,417,410 B2 | 4/2013 | Moeckly et al. | |
| 8,522,572 B2 | 9/2013 | Coffinberry et al. | |
| 9,354,621 B2 | 5/2016 | Westervelt et al. | |
| 9,558,670 B1 * | 1/2017 | Sheth | G01C 21/005 |
| 9,567,095 B2 | 2/2017 | McCarthy et al. | |
| 10,062,291 B1 * | 8/2018 | Kim | G07C 5/008 |
| 10,490,091 B1 * | 11/2019 | Lenhardt | G08G 5/0034 |
| 2007/0055392 A1 | 3/2007 | Amato et al. | |
| 2007/0061116 A1 * | 3/2007 | Bush | G01C 23/00 |
| | | | 703/8 |
| 2010/0024536 A1 | 2/2010 | Adibhatla et al. | |
| 2011/0071707 A1 * | 3/2011 | Crumm | H01M 16/006 |
| | | | 701/3 |
| 2011/0190963 A1 | 8/2011 | Matthias et al. | |
| 2012/0245747 A1 | 9/2012 | Kumar et al. | |
| 2012/0248242 A1 * | 10/2012 | Gagne | B64D 41/00 |
| | | | 244/58 |
| 2015/0362923 A1 * | 12/2015 | Westervelt | G05B 15/02 |
| | | | 700/289 |
| 2016/0221683 A1 * | 8/2016 | Roberts | B64D 27/02 |
| 2016/0284221 A1 * | 9/2016 | Hinkle | G08G 5/0069 |
| 2017/0229021 A1 * | 8/2017 | McCann | G08G 5/0039 |
| 2017/0272148 A1 * | 9/2017 | Wang | G01S 13/953 |
| 2018/0067500 A1 * | 3/2018 | Kim | G08G 5/0052 |
| 2018/0090016 A1 * | 3/2018 | Nishi | G05D 1/102 |
| 2018/0268722 A1 * | 9/2018 | Meier | G05D 1/0005 |
| 2019/0033853 A1 * | 1/2019 | O'Laughlin | B64D 37/005 |
| 2019/0164433 A1 * | 5/2019 | MacDowell | G08G 5/0034 |
| 2019/0310639 A1 * | 10/2019 | Hanson | B63B 1/042 |

OTHER PUBLICATIONS

Claggett et al., "TA health-optimal adaptive Reaction Control System for spacecraft", 2011 Aerospace Conference, pp. 1-13, Big Sky, 2011, 13 pp.

Redding et al., "Proactive planning for persistent missions using composite model-reference adaptive control and approximate dynamic programming", Proceedings of the 2011 American Control Conference, pp. 2332-2337, San Francisco, CA, 2011, 6 pp.

* cited by examiner

INTELLIGENT MISSION THERMAL MANAGEMENT SYSTEM

CROSS-REFERENCE TO RELATED APPLICATION

This is a continuation-in-part of co-pending prior U.S. patent application Ser. No. 15/609,974, filed on May 31, 2017, entitled "AIRCRAFT MISSION EXECUTION ADVISOR," which is incorporated herein by reference in its entirety for all purposes.

BACKGROUND

There is a move toward a More Electric Aircraft (MEA) for both commercial and military aircraft. The MEA trend describes the rapid increase in demand for on-board electric power (for countermeasures, avionics, jamming, directed energy weapons, etc.). For military aircraft, MEA benefits are not only used for increased range, but may also translate into increased capability. A power-thermal management system (PTMS) may be used to address various aircraft system heat loads. With increasing demand for on-board electric power, it may be increasingly difficult to manage the tradeoffs that exist between different objectives of the PTMS.

It would be desirable to provide systems and methods to improve operation of the PTMS to optimize operational control of the PTMS.

BRIEF DESCRIPTION

According to some embodiments, a method includes receiving one or more mission objectives for an aircraft mission, and condition data at a mission execution module; generating, via the mission execution module, a mission plan executable to address at least one of the one or more mission objectives via manipulation of a power-thermal management system (PTMS); receiving the generated mission plan at the PTMS directly from the mission execution module; and automatically executing the generated mission plan to operate an aircraft.

According to some embodiments, a system includes a mission execution module to receive one or more mission objectives for an aircraft mission, and condition data; a memory for storing program instructions; a mission processor, coupled to the memory, and in communication with the mission execution module and operative to execute program instructions to: generate a mission plan executable to address at least one of the one or more mission objectives via manipulation of a power-thermal management system (PTMS); receive the generated mission plan at the PTMS directly from the mission execution module; and automatically execute the generated mission plan to operate the aircraft.

According to some embodiments, a non-transitory, computer-readable medium storing instructions that, when executed by a computer processor, cause the computer processor to perform a method comprising: receiving at a mission execution module, one or more mission objectives for an aircraft mission; generating, via the mission execution module, a mission plan executable to address at least one of the one or more mission objectives via manipulation of a power-thermal management system (PTMS); receiving the generated mission plan at the PTMS directly from the mission execution module; and automatically executing the generated mission plan to operate an aircraft.

A technical effect of some embodiments of the invention is an improved and/or computerized technique and system for a mission execution planning advisor and a mission execution module for an aircraft with a power-thermal management system (PTMS). Embodiments provide for PTMS architecture that may consider available heat sinks (including fuel, ram air, and engine secondary flow streams) to effectively manage increased air vehicle thermal loads for projected next generation air vehicle requirements. The inventors note that potential next generation heat load additions may be the result of critical mission systems capabilities, advanced Directed Energy Weapon (DEW) systems, and larger more electric aircraft engine accessories, such as generators to drive enhanced mission capability. Embodiments provide for the optimization of relationships between the vehicle loads and the sinks provided by variable cycle engines. Embodiments provide for the optimization via integration of adaptive subsystems which provide the thermal lift needed to maximize the sink utilization in the most efficient manner. Embodiments provide a power source (e.g., engine bleed, electrical power or independent TMS burner) for "thermal lift" (e.g., making thermal energy 'hot enough' to be discharged in a hotter environment). In embodiments, thermal lift may be a system goal/constraint. Embodiments provide for a work-split between engines (if multi-engine), spools (High Pressure vs. Low Pressure), and thermal lift options (e.g., VCS vs. ACM), smaller high-pressure and low-pressure generators for a hybrid bleed air, and multiple Environmental Control System (ECS) packs.

Future aircraft are expected to use advanced integrated propulsion-power-thermal management systems (IPPTMS), which are an improvement to the PTMS or basic Flight Management Systems (FMS) avionics used today. Embodiments provide for operation of the IPPTMS, under the guidance of a mission advisor module and a mission execution module, that manages the tradeoffs between survivability, capability, range and thermal heat sink availability, for example. With respect to cooling fuel (or other thermal storage), for example, the mission advisor module and mission execution module may manage tradeoffs of immediate cooling fuel, in anticipation of future needs, at the cost of increased immediate fuel consumption. As a more specific example, the tradeoff may be to create more thermal storage now and fly through a higher-threat environment, or save fuel now, and fly a longer path around the environment. Embodiments may, via the mission advisor module, provide mission options (e.g., where to fly and how) to enable additional tradeoff.

Embodiments may, via the mission execution module, internally manage tradeoffs and self-select an optimized mission based on one or more rules, and then automatically provide the selected mission as input to the one or more sub-systems to execute the mission. Embodiments provide for the coupling of aircraft sub-systems to achieve optimal mission execution for example. The strategy may include modification of adaptive sub-system feature such as the split between low and high spool power extraction, the prioritization of heat sink use, and others to achieve the optimized outcome. Embodiments may also provide for improved battle damage tolerance to better withstand damage to some aspect of the asset before the asset is unable to perform an action (e.g., if a first thermal management device is disabled, a second thermal management device with similar function may compensate for the loss of the first thermal management device); adaptive PTMS modulation and functional control, where other systems may pick up the slack from lost functionality of other components so that the system does not just stop working; intelligent fault isolation and mitigation; and energy compliant selective sink utilization in response to air vehicle command and control, as compared to conventional methods.

It is noted that a difference between the mission advisor module and the mission execution module is that the mission advisor module generates several mission plan options for a pilot or system to select and then execute, whereas the mission execution module generates a single mission plan that is automatically executed by the system upon generation thereof. It is further noted that a benefit of the mission execution module is that the system does not need to rely on communication to determine actions, which may provide increased security as with no communication, the executing mission plan may avoid interception.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

DETAILED DESCRIPTION

Figure 1:
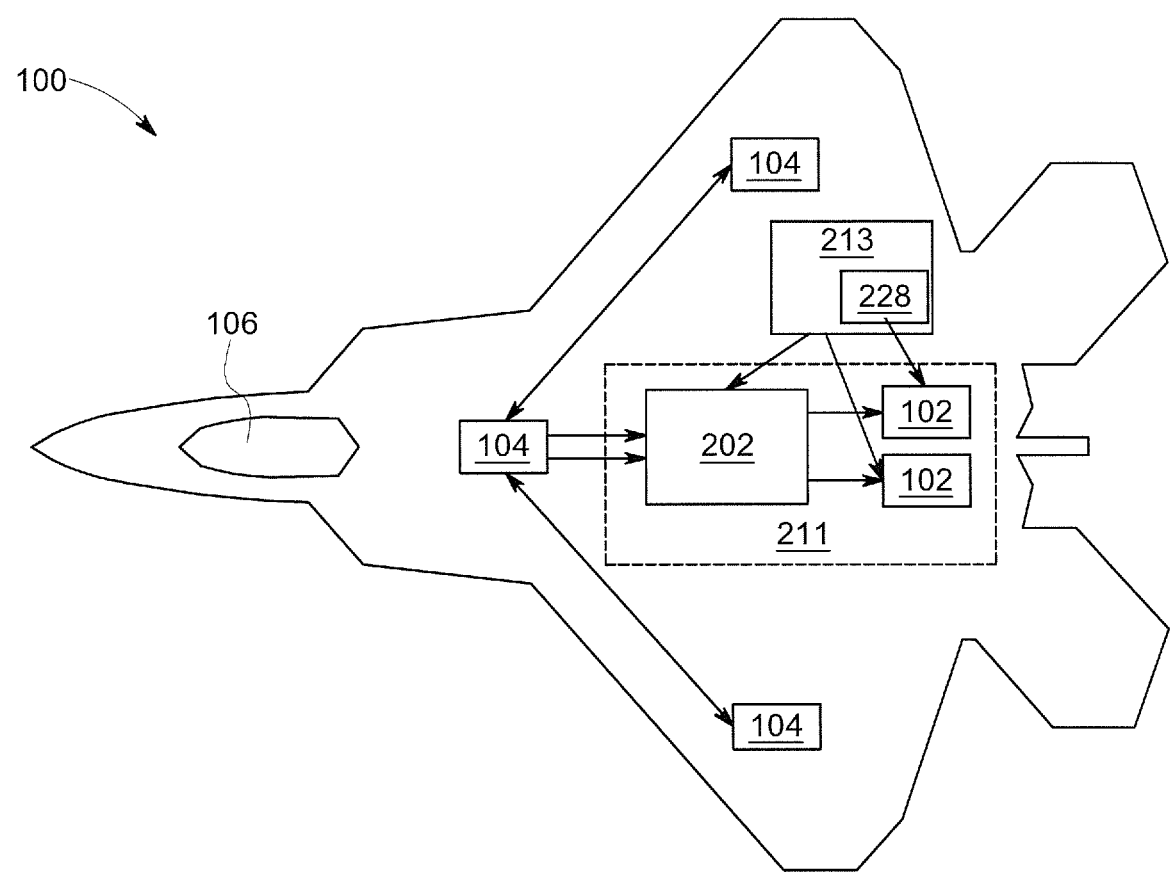
FIG. 1 illustrates a system according to some embodiments.

There is a move toward a More Electric Aircraft (MEA) for both commercial and military aircraft. The MEA trend describes the rapid increase in demand for on-board electric power. For military aircraft, MEA benefits are not only used for increased range, but may also translate into increased capability. A power-thermal management system (PTMS) may be used to address various aircraft system heat loads. With increasing demand for on-board electric power, it may be increasingly difficult to manage the tradeoffs that exist between different objectives of the PTMS.

The inventors note that potential next generation heat load additions may be the result of critical mission systems capabilities, advanced Directed Energy Weapon (DEW) systems, and larger more electric aircraft engine accessories, such as generators, to drive enhanced mission capability. While modern aircraft require a lot of power only at certain times in a flight, conventional PTMS react to a situation, and address the potential instantaneous use of on-demand systems by being designed to support a maximum demand all the time. However, if the system is designed to output peak power and absorb all of the resulting thermal energy (e.g., every Watt generated is a Watt that needs to be removed as heat), at all times, the aircraft may have very limited range, and may use up all of the internal volume. For example, over-sizing the PTMS equipment to handle peak-loads in steady-state (i.e., continuous) conditions may result in a physically larger (volume and weight) system. The larger system may result from larger turbo-machinery, piping, and association connection and control hardware in the VCS, ACM, and heat-exchangers, for example. Further, with larger equipment in the PTMS system, less aircraft volume may be left for fuel tanks (e.g., the fuel fraction may be limited without making the aircraft body larger, resulting in more drag and less range). Additionally, because the conventional system may have an increased weight, and volume, as well as an increased cost and decreased fuel efficiency, the conventional system may have minimal or no opportunity to handle damage or degradation, as compared to embodiments that may provide a smaller system that may anticipate/plan for the use of a potential demand. For example, in one or more embodiments, if a heat-sink is damaged, other sinks may be utilized, or the total cooling potential may be reduced (reduced time constant on cooling). The mission advisor module and the mission execution module may each calculate the additional time required to prepare thermal storage, and advise the pilot of the decreased capability in the case of the mission advisor module, then each plan a mission around it.

Conventional PTMS address the use of on-demand systems that may reduce these heat loads overall by reducing the cooling subsystem demands during idle periods for improved total vehicle operational effectiveness, additional fuel savings, increased rang/endurance, and improved mission capability.

Embodiments provide for PTMS architecture (and IPPTMS architecture, as described below) that may consider available heat sinks (including fuel, ram air, and engine secondary flow streams, current and future environments) to effectively manage increased air vehicle thermal loads for projected next generation air vehicle requirements. For example, with respect to current and future environments (e.g., weather), the system may anticipate the aircraft will be in a cooler airspace at a later point in time in its mission and determine, based on the objective, a mission plan that continues to reject heat at a higher expense and to maximize heat rejection during flight through a cold environment. As another example, with respect to current and future environments (e.g., enemy or friendly territory), during a sensitive signature environment, where the aircraft may be operating in a stealth mode to avoid detection of a heat signature by an enemy, the system may reduce or redirect heat rejection such that the heat signature is reduced and extra heat would be rejected over safe space (e.g., while in a safe space, the heat may be rejected so that by the time the aircraft is in an enemy environment, the aircraft is cool); or the heat may be rejected from different parts of the aircraft (e.g., the heat may be released above the aircraft instead of below the aircraft, as the heat is more likely to be detected below the aircraft).

Embodiments provide for the optimization of relationships between the vehicle loads and the sinks provided by variable cycle engines. Embodiments provide for the optimization via integration of adaptive subsystems which provide the thermal lift needed to maximize the thermal sink utilization in the most efficient manner (e.g., achieving the required cooling with the least amount of fuel to burn or other suitable mission goal). The inventors note that as used herein, "thermal lift" refers to making thermal energy "hot enough" to be discharged in a hotter environment. An opposite line of thinking may be making the cooling air/fluid cold enough to cool sensitive pieces of the system/sub-systems (e.g., electronics). As used herein maximization of thermal sink utilization may refer to making the most efficient use of thermal sinks (e.g., fuel, bypass air, ram air, etc.). Thermal sinks may have different thermal capabilities, temperatures and efficiencies, and selecting one over another may impact system performance.

Future aircraft are expected to use advanced integrated propulsion-power-thermal management systems (IPPTMS), which are an improvement to the conventional PTMS. Embodiments provide for operation of the IPPTMS (and a PTMS), under the guidance of a mission advisor module or a mission execution module, that manages the tradeoffs between reducing fuel consumption, survivability, increasing flight range, electrical and thermal capacity for use of a high-power system and thermal heat sink availability.

Embodiments provide for a mission advisor module that may provide the pilot (and/or a mission computer) with one or more choices for carrying out the mission. Each of the choices may have at least one desirable feature (e.g., reduced fuel consumption, increased flight range, and thermal heat sink availability for use of a high-power system). The mission advisor module may receive mission objectives and information about the state of the system as input. Then the mission advisor module may generate one or more mission plans for carrying out the mission. In one or more embodiments, the mission advisor module may predict and exploit the varying thermodynamic conditions, propulsion system conditions, and expected threats, for example, to generate and provide the pilot with the mission plans. Each generated mission plan may include information about the benefits of selecting this particular plan as compared to the trade-offs of selecting this particular plan.

Embodiments provide for a mission execution module that may determine a mission plan and automatically execute the determined mission plan. The mission execution module may receive mission objectives and information about the state of the system as input. Then the mission execution module may generate a mission plan for carrying out the mission based on one or more rules. As with the mission advisor module, the mission execution module may predict and exploit the varying thermodynamic conditions, propulsion system conditions, and expected threats, for example, to generate and execute a mission plan. Next the mission execution module may automatically execute the mission plan by providing input to one or more sub-systems used to execute the mission plan.

As a non-exhaustive example, execution of the mission plan generated by the mission execution module may adapt a cruise section of a flight to achieve conditions such that a thermal reservoir may be cooled to a low set point at low cost (power) to prepare for a planned future engagement, which would otherwise require significant power to reject the heat to a thermal reservoir.

One or more embodiments combine management of flight management with thermal and power management. One or more embodiments also may enable energy compliant implementation solutions for power management and transition methodologies through advanced Multi-Mode Performance Seeking Controls (PSC), and expansion of onboard Prognostic Health Management (PHM) process approaches to detect and mitigate failure conditions.

Embodiments may exploit modification of adaptive sub-system features, such as the split between low and high spool power extraction, the prioritization of heat sink use, and other features to generate the mission plan(s) for selection and/or execution. In one or more embodiments, the mission plan(s) may estimate system parameters, including deterioration or sustained sub-system battle damage to optimize overall system performance and provide adaptive mission management and flight management of an aircraft with a power-thermal management system coupled to an engine.

In one or more embodiments, receipt of the mission objectives and state data may indicate the thermal outputs that may be needed at a specific future time during the mission, and then the one or more mission plans generated by the mission advisor module, or the mission plan generated by the mission execution module, allow the system to prepare thermal storage over time; which may be preferable to the instantaneous requirement of a conventional system that may be much more limited, smaller, and lighter weight on other aspects of the aircraft.

In one or more embodiments, after the mission advisor module generates the one or more mission plans, the pilot and/or mission computer may then select one of the mission plans. After selection of one of the mission plans, the PTMS may manipulate one or more sub-systems/components of the aircraft to execute the selected option. Similarly, after the mission execution module generates the mission plan, the mission plan is automatically received by the PTMS, such that the PTMS may manipulate one or more sub-systems/components of the aircraft to execute the generated mission plan. In one or more embodiments, the mission plan may include improved battle damage tolerance, adaptive PTMS modulation and functional control, balancing thermal heat sinks between engines, and energy compliant selective sink utilization in response to air vehicle command and control. As used herein, the terms "mission plan" and "mission option" may be used interchangeably. In one or more embodiments, when any of the factors that may affect the mission plan(s) are updated (e.g., a change in mission requirements, weather, engine state, aircraft state, etc.), the mission advisor module may generate new options for carrying out the mission, and the process may be repeated, or the mission execution module may generate a new mission plan that is then automatically executed.

As used herein, the term "automatically" may refer to, for example, actions that may be performed with little or no human interaction.

Figure 2A:
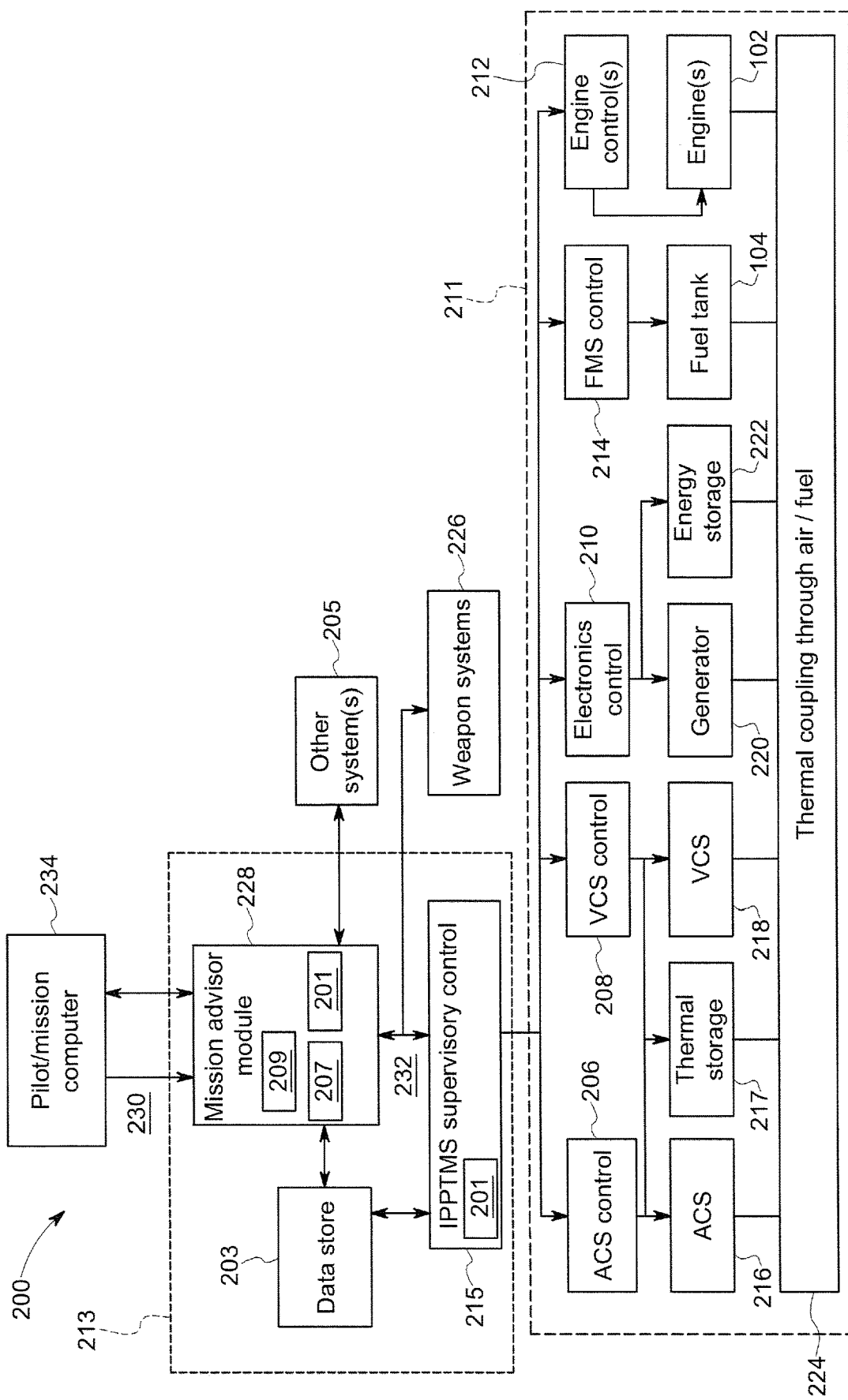
FIG. 2A illustrates a system diagram according to some embodiments.
Figure 2B:
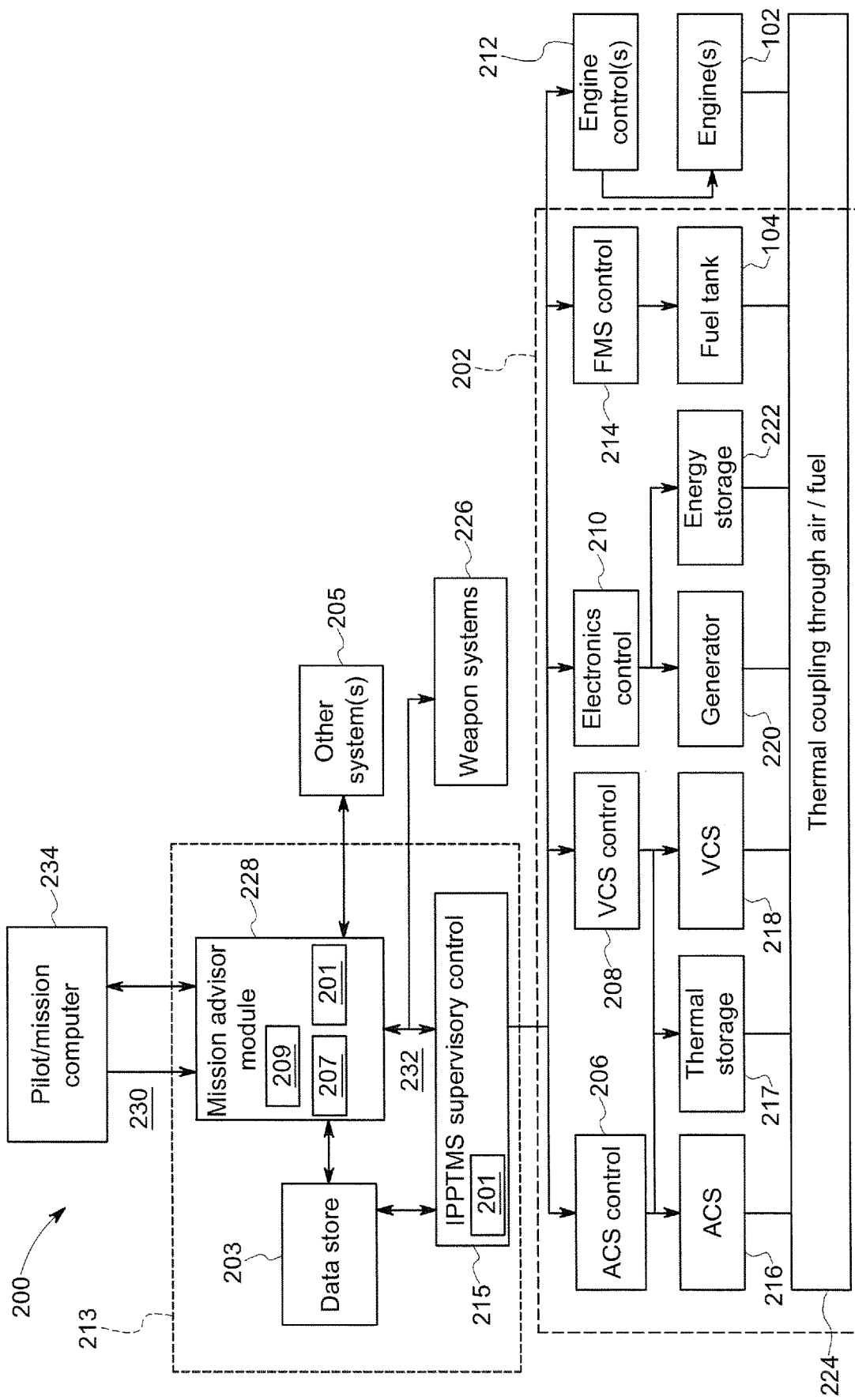
FIG. 2B illustrates a system diagram according to some embodiments.

Referring to FIG. 1, an aircraft 100 may include one or more engines 102, and one or more fuel tanks 104 for storing aircraft fuel. The engine 102 may be a turbo fan, turbo shaft engine, turbo prop engine, turbo jet, adaptive or variable cycle gas turbine engine, or any other suitable engine. Although two engines are shown, it should be appreciated that one engine, or more than two engines may be provided to the aircraft 100. The aircraft 100 may include a system 200 (FIGS. 2A/2B) or 600 (FIGS. 6A/6B), including one or more power and thermal management systems (PTMS) 202. In one or more embodiments, the PTMS may be an Integrated Propulsion Power Thermal Management System (IPPTMS) 211. As used herein, the IPPTMS 211 may include and be powered by one or more engines 102. While the following description of embodiments will mostly be described with respect to an IPPTMS 211 (FIGS. 2A/6A), the description of embodiments also may apply to a PTMS 202 (FIGS. 2B/6B). The inventors note that a difference between the IPPTMS 211 in FIGS. 2A/6A and the PTMS 202 in FIGS. 2B/6B, is that in FIGS. 2A/6A, the engine 102 and engine control 212 are integrated with the IPPTMS, while in FIGS. 2B/6B, the engine 102 and the engine control 212 may be separate. When referring to just the PTMS 202, the engine(s) and their respective controller(s) may not be included. When referring to an IPPTMS, the engine(s) and engine controller(s) are integrated with the PTMS and supervisory control. The inventors note that a legacy system may have a PTMS physically attached to an engine, but their controllers have limited, if any, communication, and the engine may accommodate the impact of power extraction and limited heat rejection. In an IPPTMS, the power and thermal systems may coordinate with the engine and the engine may then react to these demands.

In one or more embodiments, the IPPTMS 211 may serve as the environmental control system (ECS) to provide cooling for liquid and air-cooled aircraft components and equipment, as well as thermal control and pressurization for a cockpit 106.

In one or more embodiments, the system 200/600 may include a system coordinating control system 213 that may include a mission advisor module 228 or a mission execution module 628, respectively. The system coordinating control system may control operation of the PTMS 202 and the engines 102.

The IPPTMS 211 may include one or more connected sub-systems (FIGS. 2A/6A), and control the operation thereof. The sub-systems may include an Air Cycle System (ACS) control 206, a Vapor Cycle System (VCS) control 208, a high-power Electronics Control 210, a next generation air vehicle Engine control 212, and a Fuel Management System (FMS) control 214.

In one or more embodiments, the ACS control 206 may operate an ACS 216. The ACS 216 may include an air cycle machine, engine streams, one or more condensers, one or more heat exchangers and air valves.

In one or more embodiments, the VCS control 208 may operate a VCS 218. The VCS 218 may include condensers, one or more evaporators, refrigerant valves and refrigerant pumps.

In one or more embodiments, the Electronics control 210 may operate a generator 220 and energy storage 222. In one or more embodiments, the energy storage 222 may be a battery, capacitor, or other suitable electrical storage.

In one or more embodiments, the ACS control 206 and the VC control 208 may operate a thermal storage 217. In one or more embodiments, the thermal storage 217 may include coolant and a heat exchanger (e.g., evaporator) to remove heat.

In one or more embodiments, the Engine control 212 may operate the engine 102.

In one or more embodiments, the FMS control 214 may operate the fuel tanks 104, fuel pumps, and fuel valves.

In one or more embodiments, the IPPTMS 211 may provide the ability to address adaptively various aircraft system heat loads (e.g., thermal coupling through air/fuel 224) by manipulating the control of the one or more of its sub-systems/components via an IPPTMS Supervisory control 215. The IPPTMS Supervisory control 215 may represent software and hardware circuitry that includes and/or is connected to one or more processors 201 (e.g., microprocessors, integrated circuits, field programmable gate arrays, etc.) that perform operations to control the sub-components. Ideally, all waste heat may be transferred to the fuel as it is supplied to the engines 102, since the fuel is the aircraft's most efficient heat sink. However, increased heat loads combined with decreased fuel burn may result in less fuel thermal capacity. As a result, heat may be removed to the ambient air or engine bypass flow and may cause drag and reduce the benefit of electrification. The IPPTMS 211 may move heat into the fuel whenever possible, but then directs the heat to the ambient air when necessary. Embodiments including the mission advisor module 228 provide for the IPPTMS 211 to calculate different versions to move the heat into the fuel, and each version's impact on a mission objective. Embodiments including the mission execution module 628 provide for the IPPTMS 211 to move the heat in such a way that best meets the mission objective.

In one or more embodiments, the system 200 may include weapon systems 226. In one or more embodiments, the weapon systems 226 may consume significant electrical energy, and thereby develop significant waste-heat that the IPPTMS system 211 may then have to accommodate, otherwise the weapon systems 226 may overheat, resulting in reduced capability or permanent damage.

The system 200 may also include a mission advisor module 228, in one or more embodiments. The mission advisor module 228 may be in communication with a pilot/mission computer 234, the IPPTMS 211 and the weapons system 226.

In one or more embodiments, devices, including those associated with the system 200/600 and any other devices described herein, may exchange information via any communication network which may be one or more of a Local Area Network ("LAN"), a Metropolitan Area Network ("MAN"), a Wide Area Network ("WAN"), an ARINC 429, MIL-STD-1553, IEEE-1394, a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

In one or more embodiments, the mission advisor module 228 may be located internal to the IPPTMS 211 or external to the IPPTMS 211. As shown in FIG. 2A, the mission advisor module 228 is external to the IPPTMS 211 and located in the system coordinating control 213. In one or more embodiments, the mission advisor module 228 may receive information from at least one of the IPPTMS 211, via the IPPTMS Supervisory Control 215 and weapons system 226 by at least one of querying the IPPTMS 211 and the weapons system 226, respectively, and continually receiving updates from the IPPTMS 211 and the weapons system 226. The mission advisor module 228 may include one or more processing elements 201. The processor 201 may, for example, be a conventional microprocessor, and may operate to control the overall functioning of the mission advisor module 228.

In one or more embodiments, the mission advisor module 228 may receive requirements and relevant mission information. Leveraging detailed knowledge of the IPPTMS 211, the mission advisor module 228 may generate various mission plans to be received by the pilot and/or mission computer for selection thereby. The selected plan is received and executed by the IPPTMS 211 via manipulation of the sub-systems to control one or more operations of the aircraft 100. In some embodiments, signals received by the IPPTMS 211, aircraft 100 and other systems may cause modification in the state or condition or another attribute of one or more physical elements of the aircraft 100.

In one or more embodiments, the system 200 may include a computer data store 203 that may provide information to the mission advisor module 228 and/or the mission execution module 628 and may store results from the mission advisor module 228 and mission execution module 628. Data may be supplied from at least one of the PTMS 202/IPPTMS 211 and the data store 203 to the mission advisor module 228 or the mission execution module 628. In embodiments, the data store 203 may be part of the mission advisor module 228, the mission execution module 628, or the pilot/mission computer 234.

In one or more embodiments, the data store 203 may comprise any combination of one or more of a hard disk drive, RAM (random access memory), ROM (read only memory), flash memory, etc. The data store 203 may store software that programs the processor 201 and the mission advisor module 228 or mission execution module 628 to perform functionality as described herein.

Figure 3:
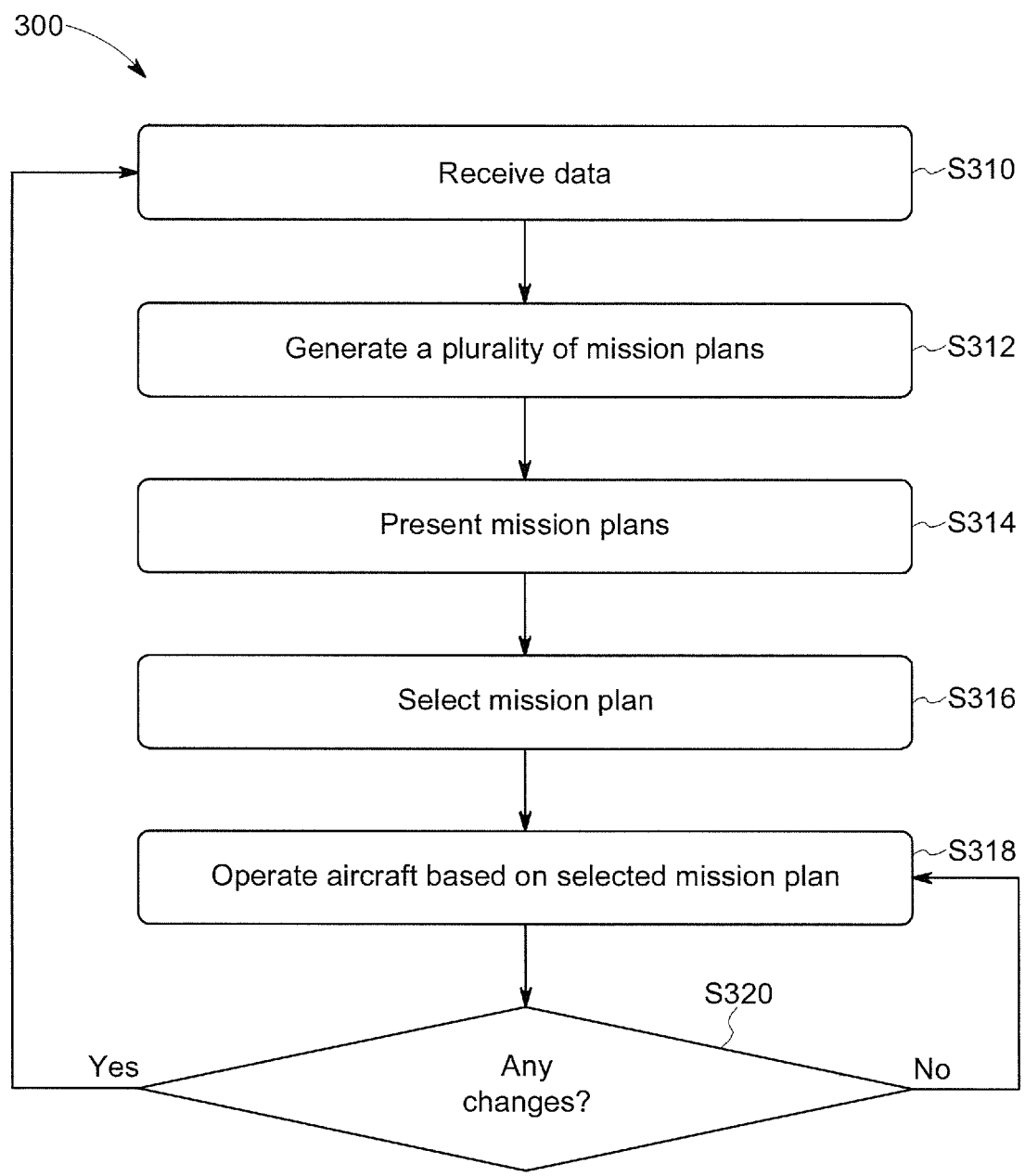
FIG. 3 illustrates a flow diagram according to some embodiments.
Figure 4:
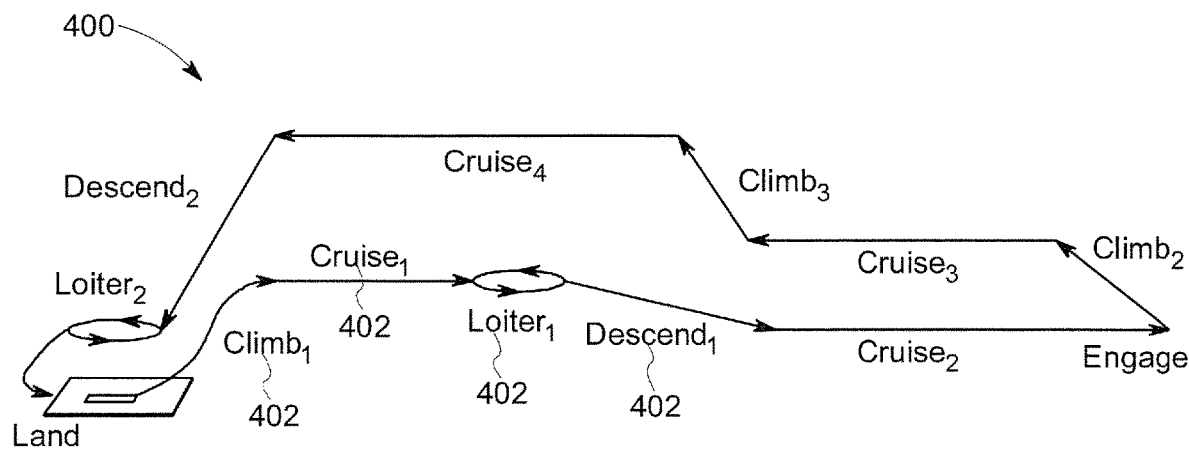
FIG. 4 illustrates a map according to some embodiments.
Figure 5:
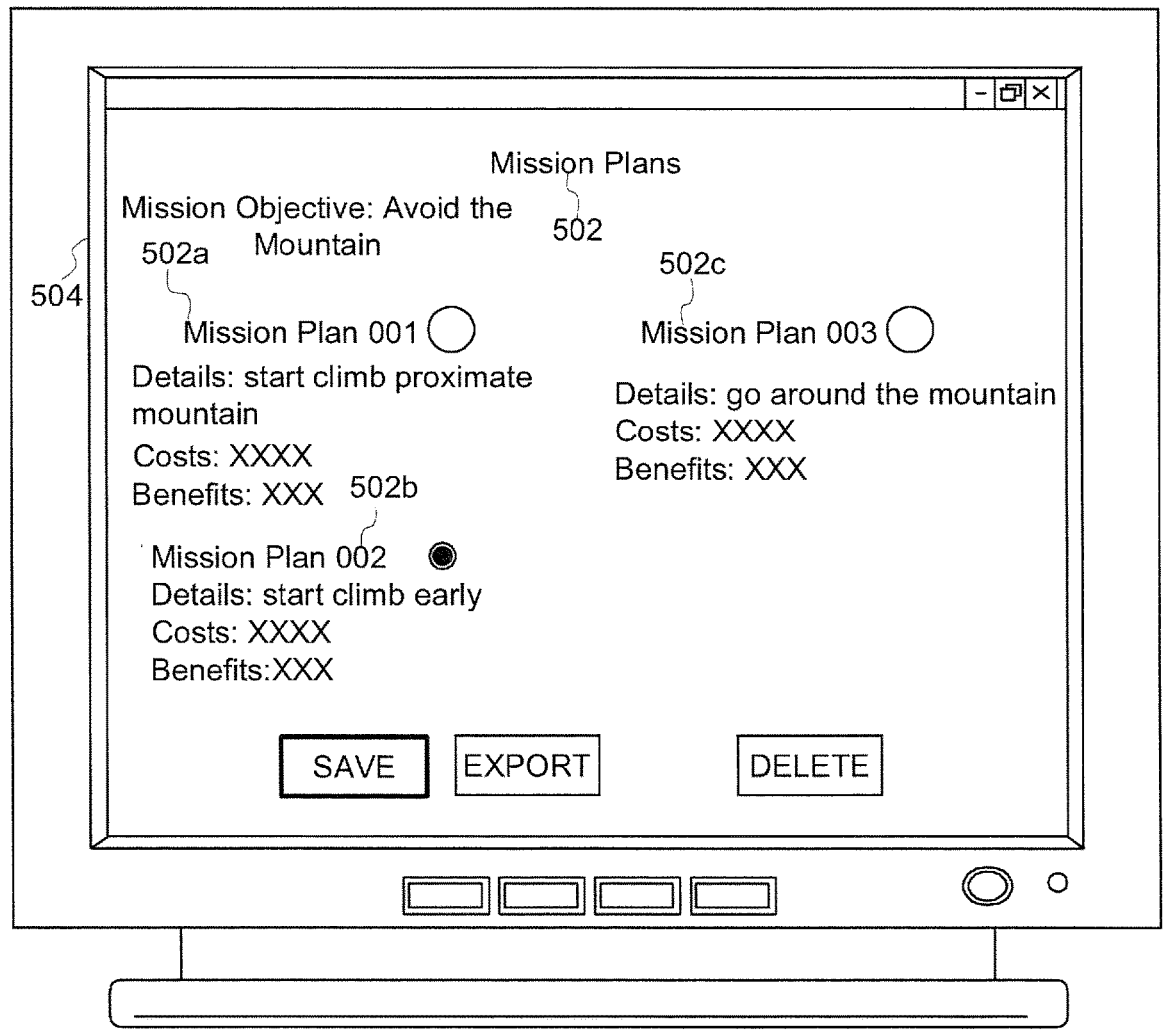
FIG. 5 illustrates a user interface according to some embodiments.

Turning to FIG. 3-5, a flow diagram of an example of operation, an example of a flight mission and an example of a mission plan according to some embodiments is provided. In particular, FIG. 3 provides a flow diagram of a process 300, according to some embodiments. Process 300, and any other process described herein (e.g., process 700 in FIG. 7), may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 200/600 is conditioned to perform the process 300/700 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Initially at S310, data is received. In one or more embodiments, the mission advisor module 228 may receive one or more mission objectives 230 for an aircraft mission, condition data 232 associated with the aircraft 100 and the aircraft mission data 400. In one or more embodiments, the mission objectives 230 and aircraft mission data 400 may be received from a pilot and/or system administrator, or any other suitable source via a mission computer 234. In one or more embodiments, the mission objectives 230 may include reduction of fuel consumption, increase flight range, and thermal heat sink availability for use of a high-power system.

In one or more embodiments, the aircraft mission data 400 may include distance, altitude, engagement plans, and aircraft speed targets. For example, the aircraft mission data 400 shown in FIG. 4, includes a plurality of segments 402 (e.g., $Climb_1$, $Cruise_1$, $Loiter_1$, $Descend_1$, $Cruise_2$, Engage, $Climb_2$, $Cruise_3$, $Climb_3$, $Cruise_4$, $Descend_2$, $Loiter_2$, and Land.) Each segment 402 may be associated with its own objective, and resulting mission plan, as described below. For example, the mission advisor module 228 may generate a mission plan 502 to use the most thermal efficiency between $Climb_1$ and $Cruise_2$, and then when the aircraft gets to $Cruise_2$, the system may prepare for additional thermal capacity/prepare thermal storage to get ready for engagement. As another example, the mission advisor module 228 may generate the mission plan 502 to tailor the $Cruise_1$ and $Cruise_2$ segments 402 of the flight plan to tailor the flight system such that a thermal reservoir may be chilled to establish a thermal capacity or storage by cooling to a low set point, optimizing for a planned future Engage segment 402, which may require significant electrical systems to reject heat to the charged thermal reservoir. As used herein, the terms "flight plan," and "aircraft mission" may be used interchangeably.

In one or more embodiments, the condition data 232 may be received from at least one of the IPPTMS 211, via the IPPTMS Supervisory Control 215, one or more other sources 205, and estimated by the system 200. In one or more embodiments, the condition data 232 may include at least one of weather data, engine state data (e.g., speeds, temperatures, fuel flows, pressures), aircraft state data (e.g., fuel temperature and quantity, aircraft weight, altitude, Mach number, ambient temperature), and power-thermal management state data (e.g., heat-sink temperatures, fuel-coolant-flow rates and temperatures, thermal energy storage state and temperature). Other suitable condition data 232 may be received (e.g., sensor damage state, and/or component damage or failure state, etc.).

In one or more embodiments, the condition data 232 may include a threat list. In one or more embodiments, the threat list may include data regarding a defined threat area, data to define what constitutes a hostile force, data to determine when hostile forces are in a pre-set range, and data to support the pilot when the pilot needs to react to a threat. For example, if a pilot is entering a hostile environment, it may be desirable to have a larger energy capacity to act in the hostile environment, if needed, as opposed to operating in a more efficient mode. As another example, when an aircraft 100 is leaving a defined threat area, the system 200 may know where the aircraft is, in relation to the defined threat area, and may act appropriately (e.g., decrease energy reserves).

However, the defined threat area may change, and this changed threat area may be received as an input to the mission advisor module 228, and the mission advisor module 228 may then generate an updated mission plan 502, as described further below. For example, one or more other sub-systems 205 of the system 200 may detect at least one hostile force near the aircraft 100. This detection may be an input to the mission advisor module 228. In one or more embodiments the mission advisor module 228 may receive input from one or more sub-systems 205 on the aircraft 100 itself, in addition to the IPPTMS 211.

In one or more embodiments the mission objectives 230 and the condition data 232 may be weighted for different segments 402 of the flight plan.

Turning back to the process 300, in S312, a first plurality of mission plans 502 to execute the mission are generated, in one or more embodiments. In one or more embodiments, each mission plan of the plurality of mission plans may address at least one of the one or more mission objectives via manipulation of the IPPTMS 211. In one or more embodiments, the objective may be to optimize at least one of the one or more mission objectives 230 via manipulation of the IPPTMS 211. In one or more embodiments, the objective may be to balance one or more objectives, without optimizing any particular parameter. In one or more embodiments, the mission plan may include inputs to the subsystems of the IPPTMS 211. These inputs may include bleed flow commands, electrical system load commands, cooling load commands, valve position command and other system set-points and configurations. In one or more embodiments, the mission plan may estimate unmeasurable system states, such as certain flows, and may estimate system, subsystem and/or component degradation. In one or more embodiments, the mission plan 502 may be generated for each mission segment 402 of the mission. As used herein, the term "mission plan" may refer to a mission plan for a single segment, or may refer collectively to the mission plans for two or more segments.

In one or more embodiments, after receipt of the mission objectives 230 and the condition data 232, the mission advisor module 228 may generate the plurality of mission plans 502 based on one or more rule sets and threshold values. In one or more embodiments, the rule sets may include one or more contingency rules or prioritization, whereby if a particular condition exists, a particular mission plan is generated over another mission plan. In one or more embodiments, the rule sets and threshold values may be received in the system 200 prior to process 300. In one or more embodiments, the mission advisor module 228 may include a model 207 representative of the operation of each of the sub-systems. In one or more embodiments, the model 207 encodes the performance of the sub-system. In one or more embodiments, the mission advisor module 228 may include an optimizer 209. The mission advisor module 228 may execute the model 207 and optimizer 209 for one or more different scenarios/simulations. For example, the model for an engine sub-system 102 may include, for a given condition, with a given geometry of the engine, the costs to produce thrust. The mission advisor module 228 may use this engine performance information to generate an optimized thrust production via the optimizer 209. In one or more embodiments, the output from the mission advisor module 228 may be at least one mission plan 502. In one or more embodiments, the output from the mission advisor module 228 may be a default mission plan that may not include any suggestions (e.g., in a failure scenario).

In one or more embodiments, each mission plan 502 may include the steps to execute the mission, and the costs associated with that execution. In one or more embodiments, the mission plan 502 may indicate which objective is being optimized. For example, if the mission plan is related to the aircraft 100 flying over a mountain, one mission plan 502a may be to do a vertical climb when the aircraft reaches the mountain, and the cost of this mission is more fuel burn, but a lower cruising altitude for longer time; another plan 502b may provide the option of starting the climb early, instead of a vertical climb when the aircraft reaches the mountain, and the cost of this mission plan is slower, potentially more efficient climb, more time at higher altitude; another mission plan 502c may be to go around the mountain, and the cost of this mission plan is longer distance, but lower overall altitude.

In one or more embodiments, the mission plan 502 may present the options that may be used to optimize certain objectives. In one or more embodiments, the input to the mission advisor module 228 may indicate when, in the future, the aircraft 100 will need different amounts of thermal energy, and then the mission plan 502 may include multiple options for the engine controller 212 to control the engine 102 to produce that power when needed in the most efficient way. In one or more embodiments, engines may be adaptable, and for a given thrust, there may be several ways to make the thrust with an internal variable configuration. Per at least one mission plan 502, the engine 102 may make power in the most efficient way possible, making the thermal management more effective. For example, if the aircraft 100 has to fly 500 miles and then engage in a mission at the end of the 500 miles, the aircraft 100 may need some thermal capability at 500 miles. In one or more embodiments, the system 200 does not need to make the most thermal power the whole 500 miles (e.g., $Climb_1$, $Cruise_1$, $Loiter_1$, $Descend_1$), but when nearing the 500-mile mark, the system 200 may produce extra thermal power (e.g., when nearing $Cruise_2$) or may intelligently use maximum power when not generating maximum heat to build up a reserve (e.g., energy storage) to accommodate the maximum heat later. The inventors note that there may be multiple ways to run the engine when the engine is a variable-cycle engine, for example, and there may be different benefits based on the operation mode. Additionally, the system 200 may be able to dissipate extra thermal power in the event there's an engagement with forces along the way to the 500-mile mark based on at least one contingency rule. In one or more embodiments, the engine 102 may include variable features and multiple generators that enable the generation of electrical power and thrust in a plurality of ways. These features may be optimized to meet thrust and power generation demands, while respecting operability limitations, in the most fuel-efficient manner. The inventors note that a benefit of embodiments is that by planning when different quantities of thermal power may be used, and taking contingencies into consideration, the engine may experience less wear and tear.

Turning back to the process 300, in S314 the generated plurality of mission plans 502 are presented to at least one of the pilot and the mission computer 234. Then in S316, a mission plan 502 is selected from the plurality of generated mission plans by at least one of the pilot and the mission computer 234. In one or more embodiments, the generated first plurality of mission plans may be presented via a user interface 504, or any other suitable presentation. In one or more embodiments, the user interface 504 may receive the output (plurality of mission plans) that is to be presented to the user/mission computer 234, and may also communicate input data (e.g., selection of a mission plan 502) received from the user or mission computer 234 to the system 200. The user interface 504 may represent a display device, a touchscreen, laptop, tablet computer, mobile phone, speaker, haptic device, heads up display, helmet mounted display, cockpit display, or other device that communicates or conveys information to a user or operator. In accordance with any of the embodiments described herein, a user may access the system 200 via user interface 504 to view information about and/or manage the aircraft 100.

Then in S318, the aircraft 100 may be operated based on the selected mission plan 502.

In one or more embodiments, the system 200 may constantly be monitoring data that may change the mission plan (e.g., at least one of the objectives 230 and condition data 232 may be updated and/or changed) during operation of the aircraft 100. In S320, it is determined whether there are any changes to at least one of the objectives 230 and the condition data 232. If it is determined in S320 that there are no changes, the process 300 returns to S318, and operation of the aircraft continues per the selected mission plan 502.

If it is determined in S320 that there is at least one change, the process 300 proceeds to S310 and the at least one changed objective 230 and condition data 232 are received as input to the mission advisor module 228. In one or more embodiments, during operation of the aircraft 100, new/updated information from the sub-systems may be received by the IPPTMS 211, and then the mission advisor module 228. The mission advisor module 228 may present new options as new data becomes available. For example, weather condition data 232 may be updated to now indicate a rain storm is up ahead, and the mission advisor module 228 may then present an option to fly around the storm. As another example, threat list data may be updated when a hostile threat is detected, and the hostile threat was not present previously; then the mission advisor module 228 may provide at least one or more mission plans related to survivability. The inventors note that while a large number of possible scenarios exist with respect to operation of the aircraft, embodiments provide an optimum for a given segment and a given objective.

The inventors note that the mission advisor module 228 may be located on-board the aircraft 100, in one or more embodiments, and/or the mission advisor module 228 may be located off-board (i.e. off of the plane) in one or more embodiments. In one or more embodiments, the off-board mission advisor module 228 may be used by a ground-based pilot or for pre-mission planning. With pre-mission planning, the mission advisor module 228 may be able to generate more options with more variables off-board than on-board, as increased computing power may be available on the ground. In one or more embodiments, a sub-set of the options generated on-ground may be sent to the aircraft 100 for selection by the pilot/mission computer. In one or more embodiments, the off-board options may be received by an on-board mission advisor module 228. In one or more embodiments, the on-board mission advisor module 228 may dynamically generate the options, based in part on the off-board options and changing data, as the mission progresses. In one or more embodiments, the on-board mission advisory module 228 may send information off-board. For example, if an off-board mission advisor was operating live (e.g., on current aircraft and environment conditions), then it may need to get that information from the aircraft. As another example, it may be desirable to send data off-board, so that the ground operations may be aware of what the aircraft is doing and may affect coordination with other aircraft. A benefit of the off-board system may be a lighter weight aircraft without an over-designed system, and access to more computational resources. Benefits of the on-board system may be that the system does not need to rely on communication to determine actions and increased security that may avoid intercepting what the on-board system is executing.

Turning to FIGS. 6A-7 and 9, a system 600 (FIGS. 6A and 6B) and a flow diagram 700 (FIG. 7) of an example of operation according to some embodiments is provided.

Figure 6A:
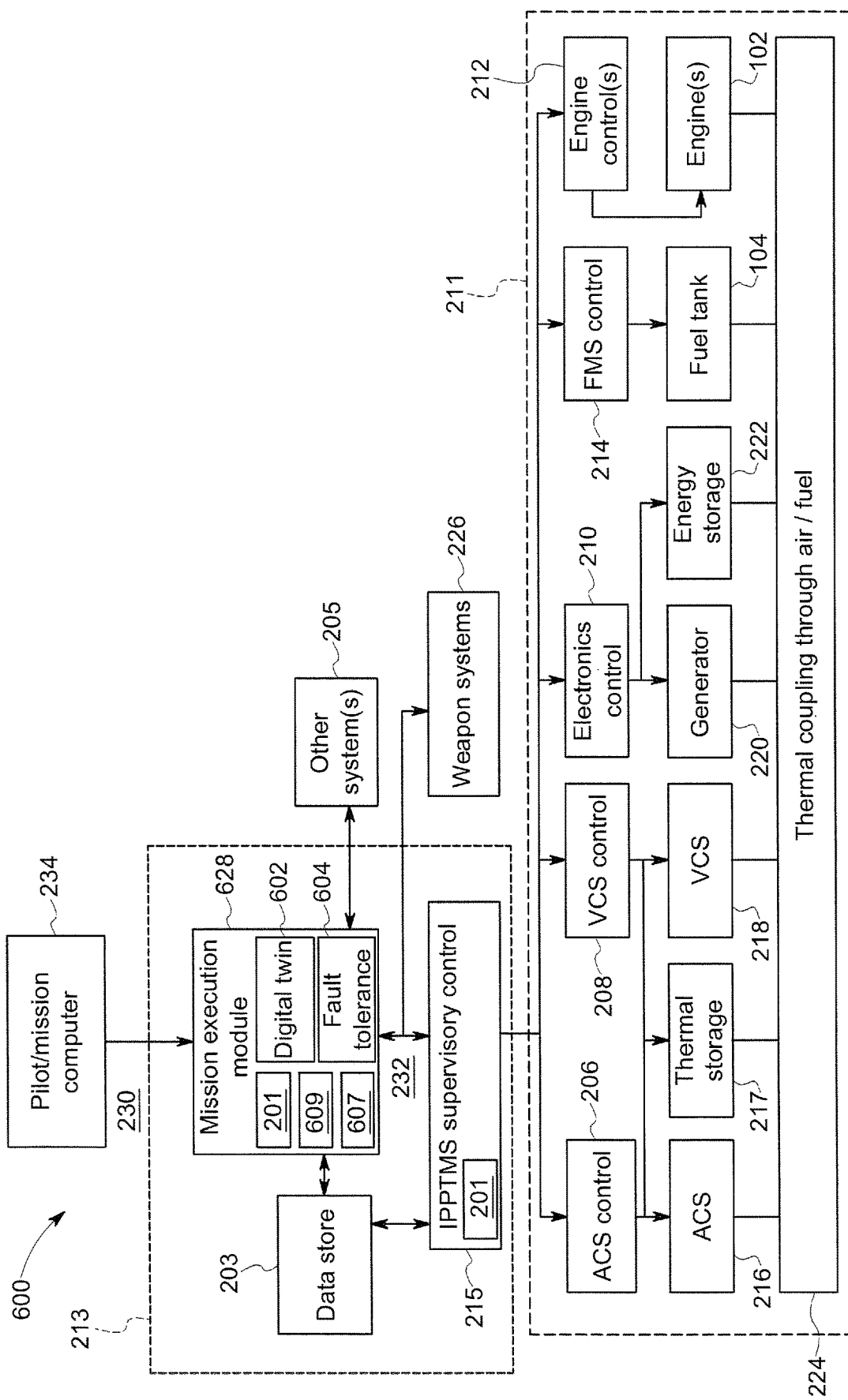
FIG. 6A illustrates a system diagram according to some embodiments.
Figure 6B:
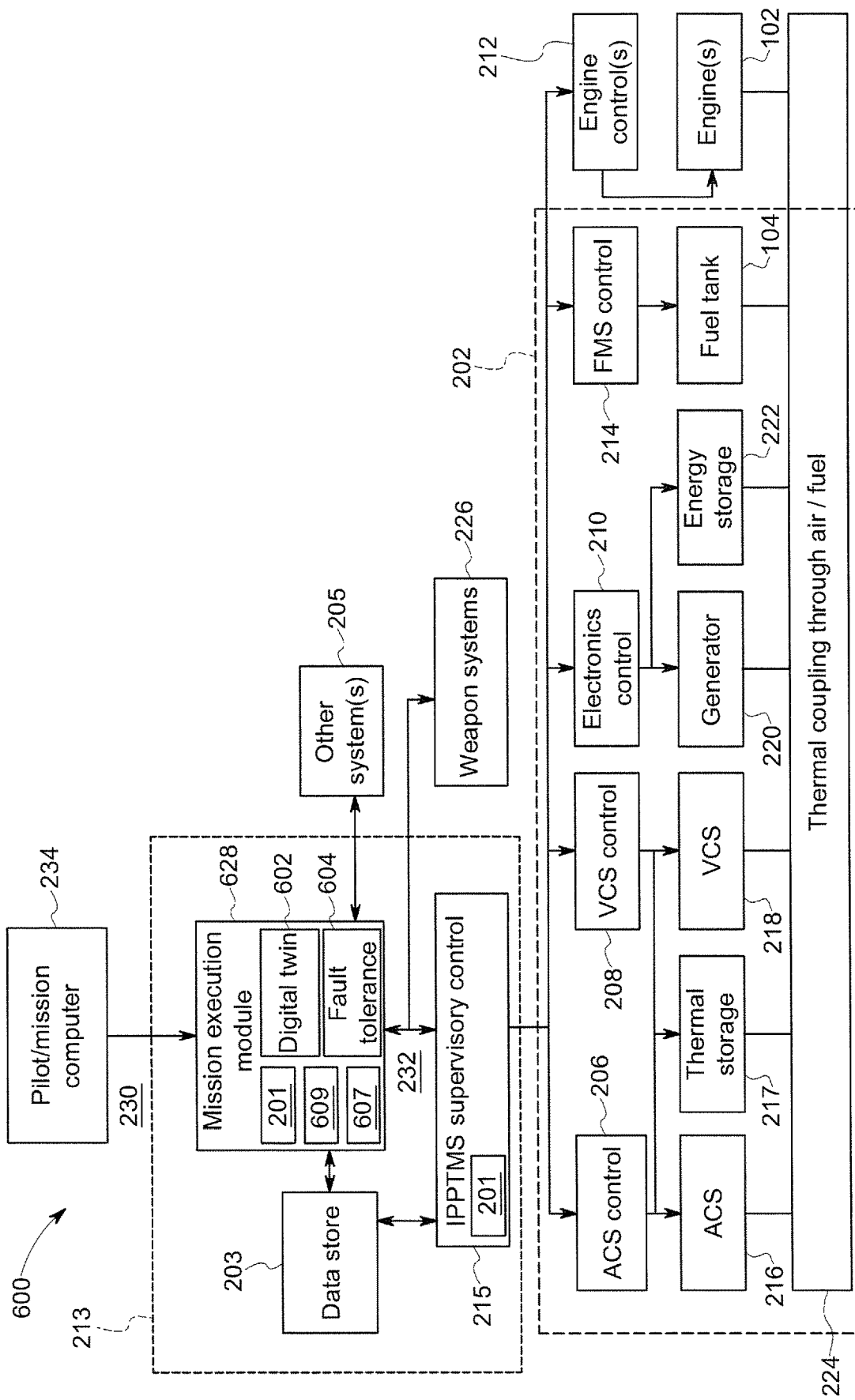
FIG. 6B illustrates a system diagram according to some embodiments.

As shown in FIGS. 6A and 6B, and as described above, the aircraft 100 may include a system 600, including one or more power and thermal management systems (PTMS) 202. The inventors note that many of the elements of the system 200 shown in FIGS. 2A and 2B are also included in the system 600 shown in FIGS. 6A and 6B, respectively. Elements that are the same in both systems 200 and 600 have the same reference numbers.

The system 600 may also include a mission execution module 628, in one or more embodiments. The mission execution module 628 may be in communication with the IPPTMS 211 and the weapons system 226, and may generate a mission plan 902 (FIG. 9) to be automatically executed by the system 600, as described further below.

In embodiments, the mission execution module 628 may be located internal to the IPPTMS 211 or external to the IPPTMS 211. As shown in FIG. 6A, the mission execution module 628 is external to the IPPTMS 211 and located in the system coordinating control 213. In one or more embodiments, the mission execution module 628 may receive information from at least one of the IPPTMS 211, via the IPPTMS Supervisory Control 215 and weapons system 226 by at least one of querying the IPPTMS 211 and the weapons system 226, respectively, and continually receiving updates from the IPPTMS 211 and the weapons system 226. The mission execution module 628 may include one or more processing elements 201. The processor 201 may, for example, be a conventional microprocessor, and may operate to control the overall functioning of the mission execution module 628.

In embodiments, the mission execution module 628 may receive requirements and relevant mission information. Leveraging detailed knowledge of the IPPTMS 211, the mission execution module 628 may generate a mission plan 902 that is automatically received by the IPPTMS Supervisory Control 215 and executed by the IPPTMS 211 via manipulation of the sub-systems to control one or more operations of the aircraft 100. In some embodiments, signals received by the IPPTMS 211, aircraft 100 and other systems may cause modification in the state or condition or another attribute of one or more physical elements of the aircraft 100. As such, the output of the mission execution module 628 may be the reference inputs to the sub-systems/components of the IPPTMS 211 for the operation thereof and reference profiles for the aircraft state. These subsystem/component inputs may include, for example, bleed flow commands (e.g., which compressor stage from which to extract bleed flow, and how much bleed flow to extract), electrical system load commands (e.g., more or less power), cooling load commands (e.g., more or less cooling), and valve position commands (e.g., on or off, or position open).

The following are non-exhaustive examples of architectures that may include sub-systems, the operation of which may be modified by the output of the mission execution module 628 in the form of the generated mission plan 902. The following examples may describe sub-systems that contain multiple components.

As a first non-exhaustive example, the aircraft 100 may be a More Electric Aircraft (MEA) with a dual spool (Low pressure (LP) spool and High pressure (HP) spool) electric power extraction engine, wherein the Environmental Control System (ECS) and Anti-ice are electric driven, as opposed to bleed-air driven. This first example may describe an engine architecture where the dual spool is part of the engine, but connects to two generators, as compared to conventional engines which may only have an HP spool. In this first example, the mission plan 902 may cause the IPPTMS Supervisory Control 215 to vary the proportion of power drawn from the LP vs. the HP spools.

As a second non-exhaustive example, an engine architecture may include the engine 102 integrated with at least one of a power gearbox, cooled cooling air, recuperation and intercooling, where each of the power gearbox, cooled cooling air, recuperation and intercooling is a sub-system including at least one heat sink as part of its components. The power gearbox is a sub-system used to transfer mechanical power from a compressor spool to a fan. The power gearbox may produce heat, and the heat is usually removed using oil. The oil may typically connect to a heatsink. The cooled cooling air is a sub-system that may transfer heat from a turbine cooling flow to a designated heatsink, allowing the turbine cooling air to be colder than it would be otherwise. Recuperation is a thermodynamic sub-system that captures waste heat from exhaust gas and transfers it to the fuel and/or air before the combustion process. In this case, the fuel and/or air may be considered a heat sink. Intercooling is a sub-system that may remove heat from a compressor working fluid, enhancing the system thermodynamic performance. That heat may be remove somewhere, most likely to the by-pass stream, but fuel if possible. Wherever it is removed, may be the heat sink associated with intercooling. In this second example, the mission plan 902 may cause the IPPTMS Supervisory Control 215 to vary which heat sink to use to receive the heat that has been rejected/ejected from any of the devices listed in these five non-exhaustive examples. Multiple heat sinks may be used across not only the engine, but the aircraft too. Some examples of heat sinks include fan by-pass air, third steam air, and fuel (including high temperature stable fuel). Other suitable heat sinks may be used.

As a third non-exhaustive example, an engine architecture may include an engine that may be a hybrid bleed air/MEA, which may include high-pressure and low-pressure generators that are smaller than are possible without the hybrid bleed air/MEA along with some capability of bleed air engines. In this third example, the mission plan 902 may cause the IPPTMS Supervisory Control 215 to vary the use of either bleed air, the high-pressure power generator and/or the low-pressure power generator to perform various functions including, but not limited to ECS, anti-ice, and thermal management of other systems.

As a fourth non-exhaustive example, the aircraft 100 may include one or more ECS packs on board, where the ECS is a sub-system. Currently, per Federal Aviation Administration (FAA) rules, commercial aircrafts are required to include two or more ECS packs on board. Each ECS pack may be sized so that one ECS pack may operate the entire aircraft 100 if the other is unable to operate. It is noted that the one operational ECS pack may operate the aircraft 100 at a lower capacity than normal, but within the allowed emergency framework given by the Federal Aviation Administration (FAA). In this fourth example, the mission plan 902 may cause the IPPTMS Supervisory Control 215 to vary the use of the ECS packs to achieve the desired optimal outcome while meeting the required ECS function. As a non-exhaustive example, if a fault is detected with one of the ECS packs by a fault tolerance element 604, described further below, the mission execution module 628 may modify the mission plan 902, which may then be received by the IPPTMS Supervisory Control, as described above, to use one ECS pack at modified capacity. It is further noted that in instances, a single ECS pack may be used, or more than two ECS packs may be used (e.g., if three ECS packs were used that were smaller than the typical two ECS packs, there may be a plan whereby if one of the three ECS packs fails, the remaining two may be able to complete the mission).

As a fifth non-exhaustive example, the mission execution module 628 may operate in concert with a Prognostic Health Management (PHM) enabling sensor suite(s) (not shown). In one or more embodiments, the PHM may predict or estimate sub-system performance anomalies may occur, and inform the Fault Tolerance module (604), which may act on this prediction, such that the mission execution module 628 may receive the detected anomalies to modify a mission plan, which may cause the IPPTMS Supervisory Control 215 to reconfigure sub-system command and control to enable critical system functionality. It is noted that the PHM may be added to an engine and may be software usable by any architecture to predict a health of the component.

The system 600 may also include a digital twin 602. "Digital twin" state estimation modeling of an industrial apparatus and/or mechanically operational entities (e.g., an aircraft) may estimate an optimal operating condition, remaining useful life, operating performance such as thermal energy storage state or other metric, of a twinned physical system using sensors, communications, modeling, history and computation. It may provide an answer in a time frame that is useful, that is, meaningfully priori to a projected occurrence of a failure event or suboptimal operation. The operation may be provided by a "digital twin" of a twinned physical system. The digital twin 602 may be a computer model that virtually represents the state of system. The digital twin 602 may include a code object with parameters and dimensions of its physical twin's parameters and dimensions that provide measured values, and keeps the values of those parameters and dimensions current by receiving and updating values via outputs from sensors embedded in the physical twin. The digital twin may have respective virtual components that correspond to essentially all physical and operational components of the aircraft and combinations of products or assets that comprise an operation.

As used herein, references to a "digital twin" should be understood to represent one example of a number of different types of modeling that may be performed in accordance with teachings of this disclosure.

The mission execution module 628, according to some embodiments, may access the data store 203 and IPPTMS 211 and then utilize the digital twin 602 to create a prediction and/or result (e.g., a predicted cooling load command) that may be used by the mission execution module 628 to generate or modify the mission plan 902. Execution of the original or modified mission plan 902 may adjust the operation of the system 600 and sub-systems. For example, in one or more embodiments, the mission execution module 628 may simulate (e.g., via the digital twin 602) a set of heat-sink temperatures with a particular objective. It is noted that the digital twin 602 may enable the system 600 to improve the benefits of the system's use by personalizing the model 602 of the system or subsystems. As a non-exhaustive example, the digital twin 602 may include a machine learning component (e.g., a neural network) to learn the performance of the heat transfer properties of a specific aircraft on which the system 600 is operating by receiving data output from operation of the aircraft, and then may use this as input to make a prediction and adjust the mission plan 902. It is noted that the output "learning" data may be received by the digital twin 602 during execution of a mission plan or from execution of previous mission plans. It is further noted that the digital twin 602 may be used to estimate unmeasurable system states, such as certain flows, and may estimate system, subsystem, or component degradation. The estimates may be used to generate the mission plan 902 (original or modified) to operate the aircraft in a manner that better meets the objectives.

The system 600 may also include a fault tolerance element 604. In one or more embodiments, the fault tolerance element 604 may detect one or more faults with at least one the sub-systems of the IPPTMS 211. Then the fault tolerance element 604 may update at least one of the digital twin 604 and the IPPTMS Supervisory control 215 (via, for example, a modified mission plan). The updates may result in the adaptation of sub-system commands to enable critical system functionality with minimal impact to the ability of the aircraft to execute the mission plan 902. For example, the digital twin 602 may use the updated data to predict the effect on the different sub-subsystems affected by the fault, so that adjustments may be made to those sub-systems. In one or more embodiments, the fault tolerance element 604 may provide the mission execution module 628 with information regarding the remaining functionality (e.g., functionality available after the fault is experienced) of the system and/or sub-systems such that the mission execution module 628 may generate feasible mission plans.

Figure 7:
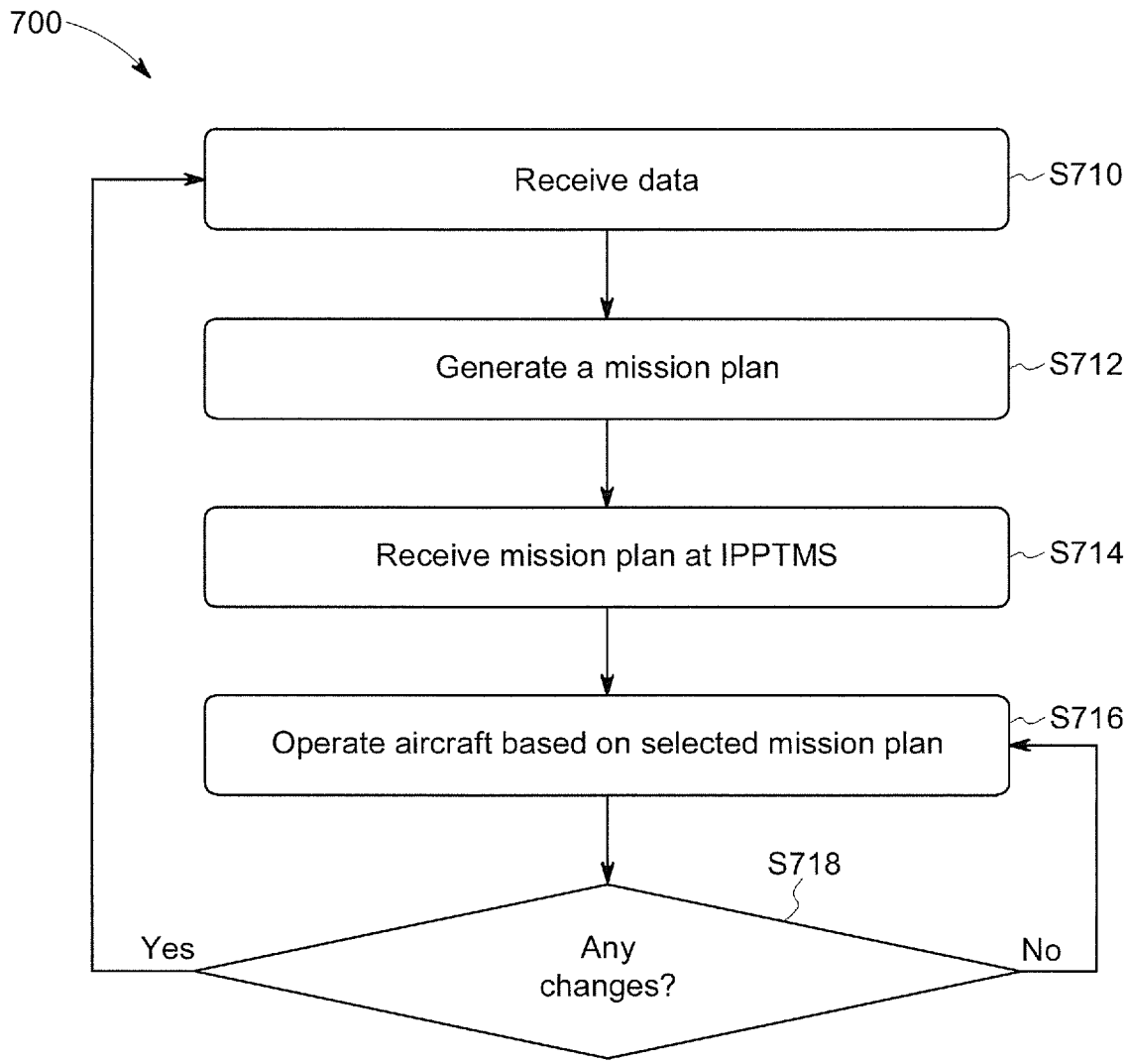
FIG. 7 illustrates a flow diagram according to some embodiments.

Turning to FIG. 7, a flow diagram 700 of an example of operation is provided.

Initially at S710 of the process 700, data is received. In one or more embodiments, the mission execution module 628 may receive one or more mission objectives 230 for an aircraft mission, condition data 232 associated with the aircraft 100 and the aircraft mission data 400, as described above with respect to FIG. 4. In one or more embodiments, the mission objectives 230 and aircraft mission data 400 may be received from a pilot and/or system administrator, or any other suitable source via a mission computer 234. In one or more embodiments, the mission objectives 230 may include reduction of fuel consumption, increase in flight range, and thermal heat sink availability for use of a high-power system.

In one or more embodiments, the aircraft mission data 400 may include distance, altitude, engagement plans, and aircraft speed targets. In one or more embodiments, like the mission advisor module 228, the mission execution module 628 may generate a mission plan 902 tailored to each segment 402 of the flight plan.

Figure 9:
FIG. 9 illustrates a table according to some embodiments.

In S712, a mission plan 902 is generated. In one or more embodiments, the mission plan 902 is generated by the mission execution module 628 to address at least one of the one or more mission objectives. As described above with respect to the mission advisor module 628, the objective may be to optimize at least one of the one or more mission objectives 230 via manipulation of the IPPTMS 211, or the objective may be to balance one or more objectives, without optimizing any particular parameter. In one or more embodiments, the mission execution module 628 may generate the mission plan 902 based on one or more rules 904 stored in a table 900 (FIG. 9). It is noted that, as used herein, the term "rule" may apply to a single rule or a set of two or more rules. In one or more embodiments, the table 900 may be stored in the data store 203. The rules 904 may be related to the input received by the mission execution module 628 (e.g., mission objective 230, condition data 232 and aircraft mission data 400). In one or more embodiments, the one or more rules may provide instructions to the mission execution module 628 on how to generate the mission plan 902. In one or more embodiments, the rules 904 may be provided by at least one of one or more software application developers, administrators, pilots, other systems, or any other suitable party. For example, the rules may be modified based on input from the digital twin. The rules 904 may be received in the system 600 prior to process 700 or may be received during process 700.

In one or more embodiments, the rules 902 may have a hierarchy, whereby if multiple rules may be applied to a particular input, the rule having a higher priority may be applied to generate the mission plan 902, or if a particular condition exists, a particular mission plan is generated over another mission plan. In one or more embodiments, different rules may be applied based on a determined level of granularity of analysis. For example, the objective may include a determined level of analysis. As a non-exhaustive example, certain objectives may use a certain amount of computational resources, and an objective may include a level of analysis whereby because of high computational considerations, a suboptimal rule(s) may be applied to generate a mission plan more quickly. In one or more embodiments, the mission execution module 628 may include a model 607 and an optimizer 609 that may be executed by the mission execution module 628 in conjunction with the rules 904 to generate the mission plan 902. The model 607 may be representative of the operation of each sub-system, and may encode the performance of the sub-system. As described in the example above, the model for the engine sub-system 102 may include, for a given condition, with a given geometry of the engine, the costs to produce thrust. The mission execution module 628 may use this engine performance information model to generate an optimized thrust production.

As a non-exhaustive example, the input to the mission execution module 628 may indicate when, in the future, the aircraft 100 will need different amounts of thermal energy, and then the mission plan 902 may include instructions for the engine controller 212 to control the engine 102 to produce that power when needed in the most efficient way.

As described above, the engine 102 may include variable features and multiple generators that enable the generation of electrical power and thrust in a plurality of ways. These features may be optimized to meet thrust and power generation demands, while respecting operability limitations, in the most fuel-efficient manner. As described above with respect to FIGS. 2A/2B, a benefit of embodiments is that by planning when different quantities of thermal power may be used, and taking contingencies into consideration, the engine may experience less wear and tear.

Next in S714, the mission plan 902 is received at the IPPTMS Control System 215. Then the mission plan 902 is automatically executed by the IPPTMS 211 per the IPPTMS Control System 215. In one or more embodiments, the mission plan 902 may include the steps to execute the mission plan 902, including the inputs to the subsystems of the IPPTMS 211. These inputs may include bleed flow commands, electrical system load commands, cooling load commands, valve position command and other system setpoints and configurations. In one or more embodiments, the mission plan 902 may estimate unmeasurable system states, such as certain flows, and may estimate system, subsystem and/or component degradation.

Then in S716, the aircraft 100 may be operated based on the mission plan 902.

As described above with respect to the system 200 of FIGS. 2A/2B, the system 600 of FIGS. 6A/6B may be constantly monitoring data that may change the mission plan (e.g., at least one of the objectives 230 and condition data 232 may be updated and/or changed) during operation of the aircraft 100. In S718, it is determined whether there are any changes to at least one of the objective 230 and the condition data 232. If it is determined in S718 that there are no changes, the process 700 returns to S716, and operation of the aircraft continues per the executed mission plan 902.

If it is determined in S718 that there is at least one change, the process 700 proceeds to S710 and the at least one changed objective 230 and condition data 232 are received as input to the mission execution module 628.

In one or more embodiments, during operation of the aircraft 100, new/updated information from the sub-systems may be received by the IPPTMS 211, and then the mission execution module 628. The mission execution module 628 may generate a new mission plan 902, as new data becomes available. For example, weather condition data 232 may be updated to now indicate a rain storm is up ahead, and the mission execution module 628 may then modify the original mission plan and execute a new mission plan to fly around the storm. As another example, threat list data may be updated when a hostile threat is detected, and the hostile threat was not present previously; then the mission execution module 628 may generate a mission plan 902 related to survivability, where rules involving hostile threats and survivability may have a higher priority than saving fuel, for example.

The inventors note that like the mission advisor module 228, the mission execution module 628 may be located on-board the aircraft 100, in one or more embodiments, and/or the mission execution module 628 may be located off-board (i.e. off of the plane) in one or more embodiments. In one or more embodiments, the on-board mission execution module 628 may send information off-board. For example, it may be desirable to send data off-board, so that the ground operations may be aware of what the aircraft is doing and may affect coordination with other aircraft. In one or more embodiments, the off-board mission execution module 628 may be used in the case of multi-aircraft planning when the mission execution functionality may be provided by a master/coordinating aircraft.

Figure 8:
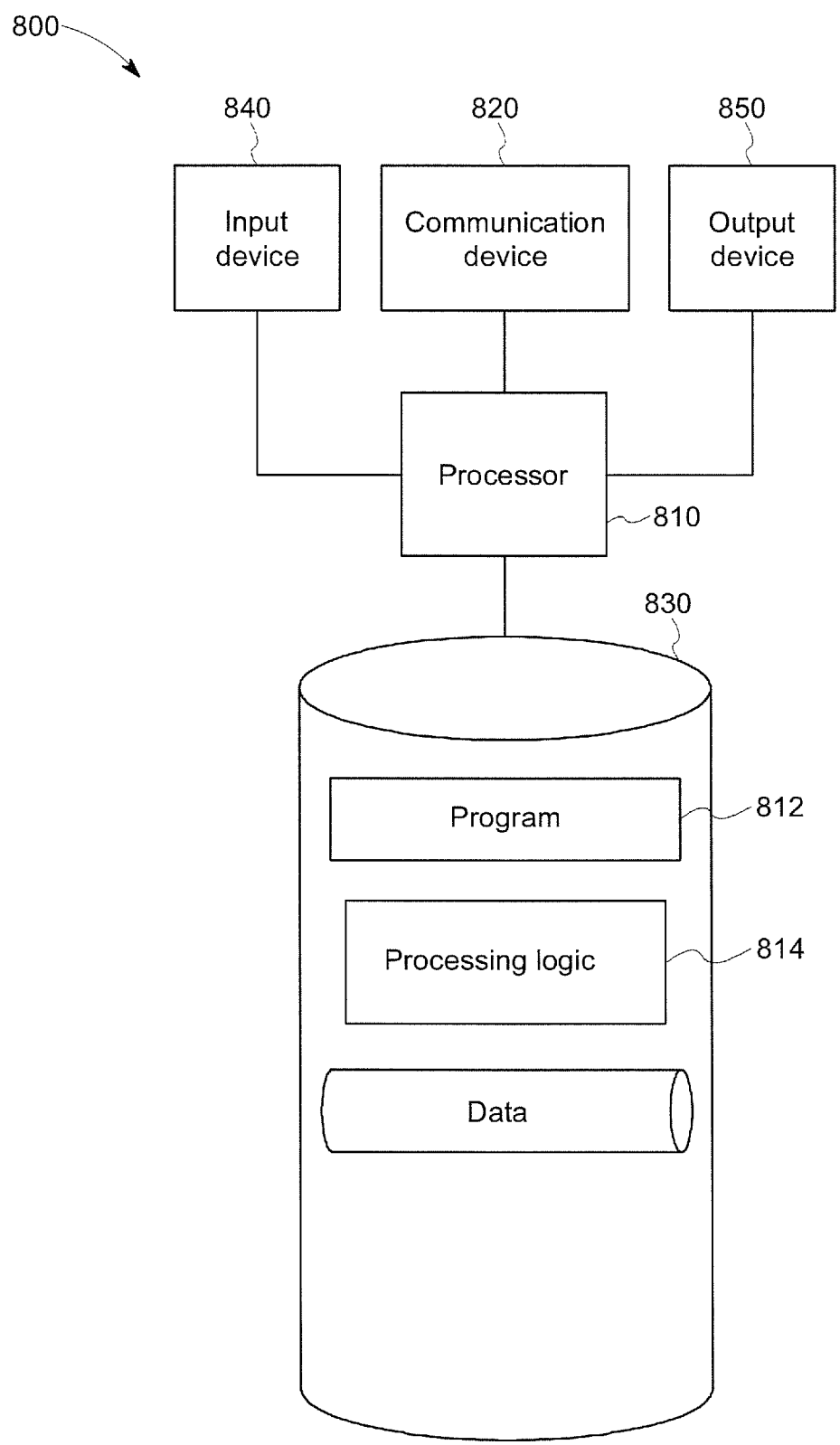
FIG. 8 illustrates a block diagram of a system according to some embodiments.

Note the embodiments described herein may be implemented using any number of different hardware configurations. For example, FIG. 8 illustrates a mission platform 800 that may be, for example, associated with the system 200 of FIG. 2 and the system of FIG. 6. The mission platform 800 comprises a mission processor 810 ("processor"), such as one or more commercially available Central Processing Units (CPUs) in the form of one-chip microprocessors, coupled to a communication device 820 configured to communicate via a communication network (not shown in FIG. 8). The communication device 820 may be used to communicate, for example, with one or more users. The mission platform 800 further includes an input device 840 (e.g., a mouse and/or keyboard, buttons, touch-screen to enter information) and an output device 850 (e.g., to output and display the executing mission and/or the mission options).

The processor 810 also communicates with a memory/storage device 830. The storage device 830 may comprise any appropriate information storage device, including combinations of magnetic storage devices (e.g., a hard disk drive), optical storage devices, mobile telephones, and/or semiconductor memory devices. The storage device 830 may store a program 812 and/or mission processing logic 814 for controlling the processor 810. The processor 810 performs instructions of the programs 812, 814, and thereby operates in accordance with any of the embodiments described herein. For example, the processor 810 may receive data and then may apply the instructions of the programs 812, 814 to determine at least one mission plan.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the platform 800 from another device; or (ii) a software application or module within the platform 800 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 810 (FIG. 8). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. For instance, the system and methods described herein may be used in other trip/mission advisory applications and automatically executing trip/mission applications such as with any hybrid/electrical, electrical and/or autonomous vehicle (e.g., truck, car, locomotive, helicopter, drone, etc.) and may also be used in other civilian environments. Therefore, it is to be understood that the claims may be practiced other than as specifically described herein.

The invention claimed is:

1. A method comprising:
receiving one or more mission objectives for an aircraft mission, and condition data at a mission execution module;
simulating, via a digital twin model, execution of the aircraft mission to address at least one of the one or more mission objectives;
receiving, at the mission execution module, data output from simulation of the digital twin model, the data output including an estimate of a thermal energy storage state of an aircraft physical system twinned with the digital twin model, the data output also including an estimate indicating degradation associated with a power-thermal management system (PTMS) or a subsystem or component thereof;
generating, via the mission execution module, a mission plan executable to address at least one of the one or more mission objectives via manipulation of the PTMS, wherein the generated mission plan is based on the received data output from simulation of the digital twin model;
receiving the generated mission plan at the PTMS directly from the mission execution module; and
automatically executing the generated mission plan to operate an aircraft.

2. The method of claim 1, further comprising:
determining a change to at least one of: one or more mission objectives and the condition data;
generating, via the mission execution module, an additional mission plan based on the change to at least one of the one or more mission objectives and the condition data; and
executing the generated additional mission plan to operate the aircraft.

3. The method of claim 1, further comprising:
detecting fault data with one or more sub-systems of the PTMS and updating the digital twin with the detected fault data.

4. The method of claim 1, wherein receiving condition data further comprises at least one of:
receiving or determining weather information;
receiving an engine state;
receiving a propulsion system state;
receiving a flight surfaces state; and
receiving a power-thermal management state.

5. The method of claim 4, wherein the engine state includes at least one of temperatures, fuel flow, speed, and efficiency of at least one engine, the propulsion system state includes fuel temperature, power split between electrical motor and turbine, fuel gauge indicating a level of fuel, the flight surfaces state includes flight surface damage/efficacy, the power-thermal management state includes at least one of heat-sink temperatures, fuel flow rates and temperatures, coolant flow rates and temperatures, and thermal energy storage state and temperature.

6. The method of claim 4, wherein at least one of the weather information, engine state, propulsion system state, flight surface state and power-thermal management state are estimated.

7. The method of claim 1, wherein the one or more mission objectives is at least one of: reducing fuel consumption, increasing flight range, increasing electrical and thermal heat sink capacity for use of a high-power system.

8. The method of claim 1, wherein execution of the mission plan further comprises:
modifying the operation of at least one sub-system of the PTMS via an operational input.

9. The method of claim 1, further comprising:
updating, by the mission execution module, the digital twin model based at least in part on information received from a fault tolerance element, the information indicating a fault associated with at least one of the subsystem and the component of the PTMS, and
wherein the simulating includes a prediction on an effect on the at least one of the subsystem and the component affected by the fault.

10. A system comprising:
a mission execution module to receive one or more mission objectives for an aircraft mission, and condition data;
a memory for storing program instructions;
a mission processor, coupled to the memory, and in communication with the mission execution module and operative to execute program instructions to:
simulate, via a digital twin model, execution of the aircraft mission to address at least one of the one or more mission objectives;
receive data output from simulation of the digital twin model, the data output including an estimate of a thermal energy storage state of an aircraft physical system twinned with the digital twin model, the data output also including an estimate indicating degradation associated with a power-thermal management system (PTMS) or a subsystem or component thereof;
generate a mission plan executable to address at least one of the one or more mission objectives via manipulation of the PTMS, wherein the generated mission plan is based on the received data output from simulation of the digital twin model;
receive the generated mission plan at the PTMS directly from the mission execution module; and
automatically execute the generated mission plan to operate an aircraft.

11. The system of claim 10, wherein the mission processor further comprises program instructions to:
determine a change to at least one of: one or more mission objectives and the condition data;
generate, via the mission execution module, an additional mission plan based on the change to at least one of the one or more mission objectives and the condition data; and
automatically execute the generated additional mission plan to operate the aircraft.

12. The system of claim 10, further comprising:
a fault tolerance element operative to detect fault data and update the digital twin with the detected fault data.

13. The system of claim 10, wherein execution of the mission plan further comprises program instructions to:
modify the operation of at least one sub-system of the PTMS via an operational input.

14. The system of claim 10, wherein the one or more mission objectives is at least one of: reducing fuel consumption, increasing flight range, increasing electrical and thermal heat sink capacity for use of a high-power system.

15. The system of claim 10, wherein the mission processor further comprises program instructions to:
update the digital twin model based at least in part on information received from a fault tolerance element, the information indicating a fault associated with at least one of the subsystem and the component of the PTMS, and wherein the simulating includes a prediction on an effect on the at least one of the subsystem and the component affected by the fault.

16. A non-transitory computer-readable medium storing instructions that, when executed by a computer processor, cause the computer processor to perform a method comprising:
receiving at a mission execution module, one or more mission objectives for an aircraft mission;
simulating, via a digital twin model, execution of the aircraft mission to address at least one of the one or more mission objectives;
receiving, at the mission execution module, data output from simulation of the digital twin model, the data output including an estimate of a thermal energy storage state of an aircraft physical system twinned with the digital twin model, the data output also including an estimate indicating degradation associated with a power-thermal management system (PTMS) or a sub-system or component thereof;
generating, via the mission execution module, a mission plan executable to address at least one of the one or more mission objectives via manipulation of the PTMS, wherein the generated mission plan is based on the received data output from simulation of the digital twin model;
receiving the generated mission plan at the PTMS directly from the mission execution module; and
automatically executing the generated mission plan to operate an aircraft.

17. The medium of claim 16, further comprising instructions to cause the computer processor to perform a method comprising:
determining a change to at least one of: one or more mission objectives and the condition data;
generating an additional mission plan based on the change to at least one of the one or more mission objectives and the condition data; and
automatically executing the generated additional mission plan to operate the aircraft.

18. The medium of claim 16, further comprising instructions to cause the computer processor to perform a method comprising:
detecting fault data; and
updating the digital twin with the detected fault data.

19. The medium of claim 16, further comprising instructions to cause the computer processor to perform a method comprising:
modify the operation of at least one sub-system of the PTMS via an operational input.

20. The medium of claim 16, further comprising instructions to cause the computer processor to perform a method comprising:
update the digital twin model based at least in part on information received from a fault tolerance element, the information indicating a fault associated with at least one of the subsystem and the component of the PTMS, and
wherein the simulating includes a prediction on an effect on the at least one of the subsystem and the component affected by the fault.

* * * * *